United States Patent [19]

Ward

[11] 4,341,812

[45] Jul. 27, 1982

[54] EDIBLE FAT PRODUCT I

[75] Inventor: John Ward, Mississauga, Canada

[73] Assignee: Nabisco Brands, Inc., New York, N.Y.

[21] Appl. No.: 187,697

[22] Filed: Sep. 16, 1980

[51] Int. Cl.³ .......................... A23D 3/02; A23D 5/00
[52] U.S. Cl. .................................... 426/603; 426/606; 426/607
[58] Field of Search ....................... 426/603, 606, 607; 260/410.7

[56] References Cited

U.S. PATENT DOCUMENTS 2,914,546  11/1959  Barsky et al. ................... 426/607 X
2,936,238   5/1960  Weiss .................................. 426/607
2,996,388   8/1961  Lindsay ............................... 426/607
3,396,037   8/1968  Bell et al. ........................... 426/607
3,617,308  11/1971  Graffelman ..................... 426/607 X
3,634,100   1/1972  Fondu ................................. 426/607

Primary Examiner—Robert A. Yoncoskie
Attorney, Agent, or Firm—Richard Kornutik

[57] ABSTRACT

Soft margarines of both the tub and fluid type, as well as blends and spreads, are formed from a unique blend of liquid vegetable oil, such as sunflower oil, with varying proportions from about 5 to about 20 wt.% of a hardstock preferably formed by interesterification of saturated babassu nut oil and saturated palm oil. The blend of vegetable oil and hardstock is high in polyunsaturates and has a low-transisomer fatty acid content.

22 Claims, No Drawings

EDIBLE FAT PRODUCT I

The present invention relates to edible fat products, particularly to edible fat products suitable for formation into soft margarines.

Table margarines generally have been produced by emulsification of blends of liquid unsaturated vegetable oils with hydrogenated hardstock in varying proportions depending on the consistency of product desired. A margarine product is required to have certain flow characteristics while resisting free oil separation and yet should be rapidly melting on the tongue. The hydrogenation required to form a hardstock which can provide such characteristics also leads to residual unsaturation which is in trans-isomeric forms of the mono-and polyunsaturates. Such trans-isomeric forms of fatty acids in the diet are currently the center of much scientific controversy and the subject of on-going research to determine what role, if any, they play in dietary health.

In accordance with the present invention, a specific hardstock has been found which alleviates this concern, while at the same time is suitable for the formulation of edible fat products for use in the production of margarines which are substantially free of trans-isomers. The invention, in its broad aspects, provides a process for forming a low-trans-isomer-containing fat product, which comprises: preparing a randomly interesterified mixture of saturated babassu nut oil having an iodine value of less than 2.0, and a second saturated edible oil having an iodine value of less than 2.0, the mixture comprising said saturated babassu nut oil and said saturated second oil in the weight proportions of 60:40 to about 40:60, the interesterified mixture resulting in a hardstock having an SFI solids content of at least about 45 at 92° F. (as determined by the AOCS SFI Method); and blending said hardstock with a liquid vegetable oil in proportions such that the resulting blend contains from about 5% to about 20% by weight of said hardstock.

While it is impractical commercially to prepare a product having absolutely no determinable trans-isomer content, the present invention contemplates those products where the trans-isomer content is substantially eliminated. Preferred products are made under suitable controls to assure a trans-isomer content of less than 1%. The term "low-trans-isomer-content" is thus defined accordingly. The trans-isomer content is determined by infra-red spectrophotometry according to the official method of the American Oil Chemists Association (AOCS) designated Cd-14-61.

The term "fat" as used herein is intended to include all edible, fatty acid triglycerides regardless of origin or whether they are solid or liquid at room temperature. Thus, the term "fat" includes normally liquid and normally solid vegetable and animal fats and oils. Where the term "oil" is employed herein, it is intended to refer to those fats which are normally liquid in their unmodified state.

The hardstock which is utilized in the present invention is a randomly interesterified mixture of saturated babassu nut oil and a saturated second oil in proportions by weight of about 75:25 to about 40:60, preferably from about 60:40 to about 40:60. These oils must be saturated, having iodine values of less than 2.0. Suitable saturated fats may be obtained by hydrogenating, either in admixture or separately, or by fractionating a suitable fat. The interesterification is effected at an elevated temperature and under vacuum in the presence of a suitable catalyst to form a product having a solids content of not less than about 45% at 92° F. (as determined by the AOCS SFI method) and preferably a Wiley melting point of about 112° to 120° F. Preferably, the solids content at 92° F. will not be less than about 50% and the Wiley melting point will be within the range of from 115° to 119° F. Completion of the interesterification reaction usually is determined by a 10° F. lowering of the melt point of the product as compared to the mixture prior to interesterification.

It is also possible to form the hardstock by first interesterifying the specified oils and then hydrogenating to the required degree of saturation. The latter procedure, however, is less preferred since completion of the interesterification is less susceptible to precise determination than in the case when the interesterification is effected after saturation of materials.

Essential to the present invention is the use as starting material of babassu nut oil, i.e., the oil from the babassu nut *Attalea funifera.* The use of this material results in a hardstock which enables margarines of varying consistencies and yet acceptable properties to be provided while at the same time permits the use of conventional processing, packaging, and equipment.

Also essential to the present invention is the use as a starting material of a second edible oil saturated to an iodine value of less than 2.0 which preferably has a melting point of from about 55° to about 60° C. This second oil is interesterified with the saturated babassu nut oil, resulting in a hardstock which contains no residual trans-unsaturation. It is within the scope of the invention to utilize suitable animal and vegetable fats which are saturated to have iodine values of less than 2.0 with preferably melting points of between about 55° C. and 60° C. These materials will provide a desirable range of physical properties and be free of trans-unsaturation. Among the suitable fats are those of animal and vegetable origin which are capable of providing these properties when saturated, but in their natural state, prior to any hydrogenation, exhibit iodine values of less than about 60, preferably less than about 50.

Blends or fractions of vegetable fats including palm oil, and coconut oil; and animal fats such as tallow, can be employed where they meet the above criteria. The preferred vegetable fat according to the invention comprises palm oil, and the preferred animal fat comprises tallow.

The requisite low-trans fat of the present invention is not achieved when the second edible oil comprises an unsaturated oil such as rapeseed oil [Canola oil], cottonseed oil, soybean oil or a highly unsaturated fraction of these or other fats. When such fats are employed and the hydrogenation is continued to the point necessary to yield the melting point range of 55° to 60° C., trans-isomer contents detectable in amounts significantly greater than 1% remain. And, where hydrogenation is effected to result in saturation with a correspondingly higher melting point, the interesterification product is incapable of providing an edible fat product having the preferred SFI values.

In the market place, margarines are generally sold as one of two principal types, namely, print, hard or stick margarine and soft or tub margarine. Hard or stick margarine would have a firmness consistent with a penetration range of 65 to 120 being in units of 0.1 mm using an ASTM grease cone at 45° F. Soft or tub margarine would have a firmness consistent with a penetration range of 130 to 210 being in units of 0.1 mm using an ASTM grease cone at 45° F. Lesser amounts of margarine are sold in a form so soft that it is fluid, being at least capable of being squeezed from a flexible container. The present invention is directed to the production of edible fat products suitable for use in the tube and fluid forms. It is also within the contemplation of the invention that the fat products of the invention can be employed in the preparation of calorie-reduced margarine (diet margarine), industrial shortenings, blends with dairy products and spreads containing less than 80% fat.

The SFI solids values required for an edible fat to be used in formulation of a tub margarine are a minimum solids content of 9% at 50° F., a minimum solids content of 5% at 70° F. and a maximum solids content of 4% at 92° F. Preferably, the maximum solids content at 50° F. will be less than 12%, at 70° F. will be less than 7%, and will be less than 3% at 92° F. Most preferably, the maximum solids content at 92° F. will be about 2%. A margarine formed from an edible fat product of this specification is easily spread at room temperature without substantial oil separation, and yet a good mouth break at about 96° F. results. Such a product may be formulated, in accordance with this invention, from an edible fat product which is a blend of liquid unsaturated vegetable oils and the hardstock containing about 5 to about 20 wt.% of the hardstock, preferably from 14 to 20 wt.%, most preferably above 15, typically from about 16 to about 19 wt.%.

For squeezable fluid spreads having a minimum hardstock content of 5 wt.%, the SFI solids values should be near the lower ends of the above ranges and are preferably just below them having, for example, a minimum solids content of 2% at 50° F., a minimum solids content of 1% at 70° F., and a maximum solids content of 1% at 92° F. Preferably, the maximum solids content at 50° F. will be 5% and at 70° F. will be 3%.

It has previously been suggested in U.S. Pat. No. 3,617,308 to use, in the formulation of margarines, a randomly interesterified product of a mixture of fully hardened palm kernel oil and a fully hardened vegetable oil, such as palm oil, rapeseed oil [Canola oil], cottonseed oil, or soyabean oil. The blends of resulting hardstock with liquid vegetable oil contain 8 to 15 wt.%, preferably 8 to 12 wt.% of the hardstock. One key starting material in that patent is palm kernel oil, i.e., the oil from the kernel of the palm fruit *Elaeis quineensis*, a quite different starting material from that used in this invention, where babassu nut oil is used. This patent is not concerned with the production of a low-trans-isomer-content fat, and in fact of the various hardened vegetable oils which may be used to form the interesterification product, only palm oil is suitable for forming a product having no trans-unsaturation. The soyabean oil, rapeseeed oil [Canola oil] and cottonseed oil when hardened to only 55° C., the low end of the slippoint range set forth in the Patent, contain detectable amounts of trans-isomers.

The ability to formulate an edible fat product containing up to 95 wt.% of liquid vegetable oil enables high levels of polyunsaturates to be attained both in tub and fluid formulations in this invention. In general, higher polyunsatraute levels in the margarine may be attained than in conventionally-formulated margarines, and, at the same time, trans-unsaturated isomers are absent from the product.

A wide variety of edible liquid vegetable oils may be used in formulating the edible fat product from the interesterified hardstock, including safflower oil, sunflower oil, soyabean oil, corn oil, cottonseed oil, rapeseed oil [Canola oil], peanut oil, linseed oil, wheat germ oil. The liquid vegetable oils most suitable have a ratio of polyunsaturates to saturates (P/S) of greater than 2:1.

The fat blends provided in accordance with this invention may be emulsified to form margarines in conventional manner, as well as to form blends and spreads. Typically, the edible fat product is emulsified with an aqueous phase at an elevated temperature at which the fat product is liquid and then subjected to rapid chilling. This procedure may be effected using apparatus of conventional kind comprising one or more scraped surface tubular heat exchangers, for instance, "Votator" apparatus, wherein the emulsion is worked up to form a water-in-oil emulsion of suitable consistency for spreading. The super-cooled emulsion is filled into suitable containers.

If desired, the initial liquid fat mixture may be subjected to a crystallizing step, either before or after emulsification or, before the final chilling step, and further crystallization may be effected, for example, in resting or working units, such as Votator B-units or whipping units, before filling or forming the plastic emulsion into containers. Additionally, the plastic emulsion may be worked mechanically between the resting or working units and the filling or forming device.

The invention is illustrated further by the following examples:

EXAMPLE 1

This example illustrates the formation of low-trans-isomer-content hardstock from babassu nut oil and palm oil for use in products according to the invention.

Babassu nut oil was hydrogenated at 300° F. using a suspension of 0.2% nickel catalyst (26% Ni) based on the oil to an iodine value of less than 2.0 to form a saturated product of melting point 113° F. (45° C.). Palm oil was similarly hydrogenated using nickel catalyst to an iodine value of less than 2.0 to form a saturated product of melting point 140° F. (60° C.). The hydrogenated materials were filtered to remove the nickel.

The resulting saturated babassu nut oil and saturated palm oil were mixed in the weight proportion of 50:50 and steam stripped to decrease the free fatty acid content below about 0.03 wt.%. Under a high vacuum of 2 to 3 mm Hg, the mixture was heated at 250° F. in the presence of 0.05% sodium methoxide catalyst under agitation for 15 minutes. A sample of product was analysed to confirm that the interesterification was complete, as determined by 10° F. lowering of the melt point of the product as compared to the mixture prior to interesterification.

The temperature was then decreased to 180° F. and 0.4 wt.% of a 30% aqueous solution of magnesium sulphate in hot water was added to destroy residual catalyst. The temperature was then raised to 210° F. and 1% bleaching earth was added to bleach the product. Thereafter, the interesterified material is cooled and filtered.

The hardstock product produced was found to have an SFI solids value of 54.4% at 92° F. and a Wiley Melting point of 117.5%. In addition, the hardstock product was found to contain no trans-isomeric forms, as determined by infra-red spectrophotometry.

EXAMPLE 2

This example shows the blending of the hardstock of Example 1 with a liquid vegetable oil and the formation of low-trans-isomer-content tub margarine from the blend.

The hardstock formed according to Example 1 was blended with sunflower oil to form a blend containing 16% by weight of the hardstock. The resulting blend had an unsaturates to saturates ratio of 2.2:1 [57% polyunsaturates to 24% saturates based on the total weight of the fat], and exhibited the following SFI solids values:

9.4% at 50° F.
6.2% at 70° F.
2.0% at 92° F.

The blend was combined with about 20% of its weight of an aqueous phase and processed through conventional "Votator" A units and working B unit to form a water-in-oil emulsion which is forwarded to conventional packaging equipment to provide a tub margarine. The resulting margarine spread readily, did not exhibit oil separation during processing or subsequently at room temperature, and had good mouth break. The margarine had a penetration of 160, being in units of 0.1 mm using an ASTM grease cone at 45° F.

EXAMPLE 3

This example shows the formation of a low-trans-isomer-content hardstock formed in similar manner to example 1 but in the weight proportion of 55% saturated babassu nut oil 45% saturated tallow, which blend was subsequently interesterified. The hardstock product produced was found to have an SFI solids value of 45.7% at 92° F. and a Wiley melt point of 116° F.

In summary of this disclosure, the present invention provides an edible low-trans-isomer-content fat product which may be used in both tub and fluid margarine production. Modifications are possible within the scope of the invention.

What we claim is:

1. A process of forming a low-trans-isomer-containing edible fat product with a trans-isomer content no greater than about 1%, which comprises:
   preparing a randomly interesterified mixture of saturated babassu nut oil having an iodine value of less than 2.0 and a second saturated edible oil having an iodine value of less than 2.0, the mixture comprising said babassu nut oil and said second oil in the weight proportions of about 75:25 to about 40:60, the interesterified mixture resulting in a hardstock having an SFI solids content of at least about 45% at 92° F., and,
   blending said hardstock with a liquid vegetable oil in proportions such that the resulting blend contains about 5% to about 20% by weight of said hardstock.

2. The process of claim 1 wherein said second saturated edible oil has a melt point of from 55° C. to 60° C.

3. The process of claim 1 wherein said hardstock has a Wiley melting point of from about 112° to about 120° F.

4. The process of claim 1 wherein said hardstock and said liquid vegetable oil are blended in such proportions that the resulting blend exhibits SFI solids contents of at least 9% at 50° F., at least 5% at 70° F. and a maximum of 3% at 92° F.

5. The process of claim 4 wherein said blend contains about 14 to 20% by weight of said hardstock.

6. The process of claim 5 wherein said blend contains above 15% by weight of said hardstock.

7. The process of claim 6 wherein said blend contains from about 16 to about 19% by weight of said hardstock.

8. The process of claim 4 wherein said resulting blend exhibits SFI content maximum of 12% at 50° F. and 7% at 70° F.

9. The process of claim 1 wherein the saturated babassu nut oil is prepared by hydrogenation.

10. The process of claim 1 wherein the saturated babassu nut oil is obtained by fractionation of babassu nut oil.

11. The process of claim 1 wherein said saturated second oil is prepared by hydrogenation.

12. The process of claim 1 wherein said second oil comprises a fat of vegetable or animal origin which prior to any hydrogenation exhibits an iodine value of less than about 60.

13. The process of claim 12 wherein said second oil prior to hydrogenation exhibits an iodine value of less than about 50.

14. The process of claim 13 wherein said second oil comprises a member selected from the group consisting of palm oil, coconut oil, tallow and combinations of these.

15. The process of claim 14 wherein the second oil comprises palm oil or tallow.

16. The process of claim 15 wherein the second oil consists essentially of palm oil.

17. The process of claim 1 wherein said second oil is obtained by fractionation of that oil.

18. The process of claim 1 wherein said liquid vegetable oil comprises a member selected from the group consisting of safflower oil, sunflower oil, soyabean oil, corn oil, cottonseed oil, rapeseed oil, peanut oil, linseed oil, wheat germ oil.

19. The process of claim 1 wherein the hardstock has an SFI solids content of at least about 50% at 92° F.

20. The process of claims 4, 5, 6, 14, or 18 including forming said blend into a tub margarine.

21. A low-trans-isomer containing edible fat product with a trans-isomer content no greater than about 1% comprising a blend of about 5 to about 20% by weight of a hardstock and the balance by weight of liquid vegetable oil, the hardstock having an SFI solids content of at least about 45% at 92° F., said hardstock being a randomly interesterified mixture of saturated babassu nut oil having an iodine value of less than 2.0 and a second saturated edible oil having an iodine value of less than 2.0, the mixture comprising said babassu nut oil and said second oil in the weight proportions of about 75:25 to about 40:60.

22. A low-trans-isomer margarine with a trans-isomer content no greater than about 1% which comprises a water-in-oil emulsion wherein the oil phase comprises a blend of about 5 to about 20% by weight of a hardstock and the balance by weight of liquid vegetable oil, the hardstock having an SFI solids content of at least about 45% at 92° F., said hardstock being a randomly interesterified mixture of saturated babassu nut oil having an iodine value of less than 2.0 and a second saturated edible oil having an iodine value of less than 2.0, the mixture comprising said babassu nut oil and said second oil in the weight proportions of about 75:25 to about 40:60.

* * * * *

UNITED STATES PATENT OFFICE
CERTIFICATE OF CORRECTION

PATENT NO. : 4,341,812

DATED : July 27, 1982

INVENTOR(S) : John Ward

It is certified that error appears in the above-identified patent and that said Letters Patent are hereby corrected as shown below:

Column 3, line 6, "tube" should read -- tub --.

Column 4, line 66, after "117.5", delete "%" and substitute therefor -- °F --.

Signed and Sealed this

Nineteenth Day of October 1982

[SEAL]

Attest:

GERALD J. MOSSINGHOFF

Attesting Officer

Commissioner of Patents and Trademarks